April 8, 1969     C. W. COOPER ET AL     3,437,541
PRE-FORMED PLASTIC LOCKING ELEMENT FOR FASTENERS
Filed March 6, 1967
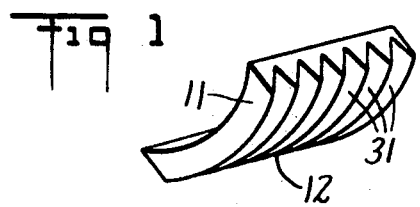
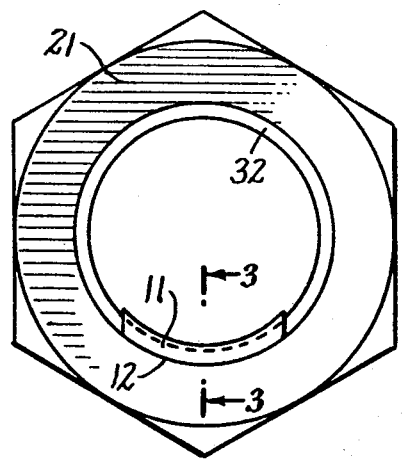
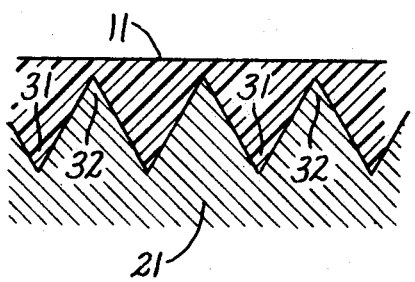
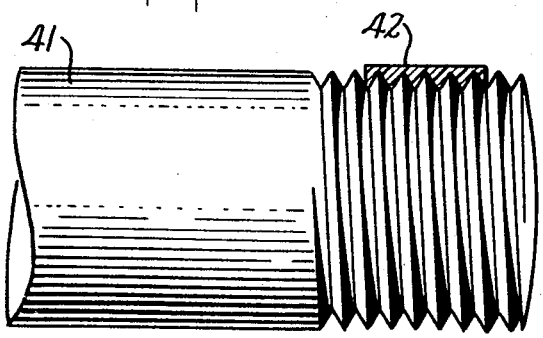
INVENTOR.
Charles W. Cooper
BY Michael M. Epstein
Curtis Morris + Safford
ATTORNEYS

3,437,541
PRE-FORMED PLASTIC LOCKING ELEMENT FOR FASTENERS
Charles W. Cooper and Michael M. Epstein, Columbus, Ohio, assignors to Standard Pressed Steel Co., Jenkintown, Pa., a corporation of Pennsylvania
Filed Mar. 6, 1967, Ser. No. 620,775
Int. Cl. C09j 5/06, 5/02
U.S. Cl. 156—306                                         5 Claims

ABSTRACT OF THE DISCLOSURE

Method of making a plastic locking element bonded to a threaded fastener by pre-forming the locking element from a thermoplastic to have threads matching the threads of the fastener surface to which the thermoplastic is to be bonded, and then heating the thermoplastic above its softening point in situ on the fastener to bond said thermoplastic thereto.

---

This invention relates to a method of making a plastic locking element on a fastener, particularly a threaded fastener, and to form thermoplastic articles useful in said method.

U.S. Patent 3,093,177 to Villo discloses a method of forming a plastic locking element on fasteners, such as threaded metal bolts, using a pellet of a polyamide (nylon-type) plastic which is bonded to the threaded portion of the fastener.

It has also been proposed in the art to employ finely-divided plastic materials in place of the pellet of the Villo patent. For example, a powdered resin is distributed along a portion of the surface of a bolt, or in the threaded interior of a nut, and the surface bearing the plastic is then heated with the resin in situ to cause fusion and flowing of the resin and adhesion to the fastener surface. While this technique is suitable in some cases, it is open to the general objection that it requires the handling of powders. The technique also requires temperatures and heating times promoting complete fusion of the powdered resin for formation of a coherent and adherent film. Using the powder technique, it is particularly difficult to bring about an even distribution of the plastic material over the surface of a fastener without creating an excess or a deficiency of the material in certain portions thereof. A deficiency of plastic in the locking element will result in too low a removal torque. On the other hand an excess of plastic, particularly if the layer of plastic rises substantially above the crest of a threaded fastener, will produce too high a removal torque. For optimum results, it is desirable that the thickness of the plastic in the locking element should be approximately equal to the depth of the thread root, and that the plastic should anchor itself firmly to the root and flanks of the thread.

According to the present invention, good distribution of the plastic comprising a locking element on a fastener can be achieved without the disadvantages of powder handling and without the need for pressure for distribution of the plastic by preforming a thermoplastic into an article or insert of the shape and dimensions desired in the locking element to be formed on a fastener. Particularly, for threaded fasteners, the inserts are pre-formed with a thread matching the thread of the fastener on which they are to be employed. The pre-formed thermoplastic inserts are then placed in position on the fastener to which they are to be bonded, and the combination is then submitted to temperatures sufficient to soften and/or fuse the pre-molded insert and to bond the plastic insert to the fastener surface.

A better understanding of the present invention and of its many advantages will be had by referring to the accompanying drawings, given by way of illustration.

In the drawings:
FIG. 1 is a perspective view of a formed thermoplastic article useful for producing a plastic locking element on a female fastener such as a threaded nut;
FIG. 2 is a front view of a threaded nut showing the formed plastic insert of FIG. 1 in situ thereon;
FIG. 3 is an enlarged side sectional view taken along lines 3—3 of FIG. 2 showing details of the plastic insert in position on the nut thread; and
FIG. 4 is a side view of a portion of a male fastener, specifically of a threaded bolt, having thereon a formed thermoplastic article for producing a plastic locking element on the fastener.

Particularly, FIG. 1 shows arcuate pre-formed plastic article or insert 11 having convex threaded surface 12. The insert, which is conveniently shaped by injection molding, machining, or by other well-known plastic forming techniques, may comprise any of a variety of thermoplastic materials known to be useful for the formation of locking elements on fasteners. These materials include plastics and resins such as the polycarbonates, the polyamides (nylons), polyacetals, polyimides, acrylonitrile-butadiene-styrene copolymers, polyphenylene oxides, polysulfones, rigid polyvinyl chloride, and their equivalents.

FIG. 2 shows insert 11 of FIG. 1 in position in a female fastener, specifically metal hexagonal nut 21. As shown in FIG. 3, a view in section along lines 3—3 of FIG. 2, threads 31 on convex surface 12 of plastic article 11 substantially conform in pitch and depth with threads 32 on nut 21. The thickness of the plastic in insert 11, the length of the insert, and its position in nut 21 are all selected by the artisan to produce a locking element of the desired shape and size and containing a desired amount and distribution of plastic therein.

FIG. 4, finally, shows a portion of a threaded bolt 41 having pre-formed thermoplastic insert 42 in position thereon. Insert 42 is molded or otherwise formed with a threaded concave surface whose threads conform with those of the bolt fastener in depth and pitch.

After positioning of the formed thermoplastic insert on a fastener, the surface portions of the fastener in contact with the thermoplastic are heated to a temperature above the softening point or fusion point of the thermoplastic. This softening or fusion of the plastic at the plastic-metal interface promotes adhesion of the plastic to the metal, without the need for applying pressure.

The use of formed thermoplastic inserts is of particular advantage for making plastic thread locks on threaded fasteners. Because of the pre-forming of the insert, good distribution of the plastic in the threads is assured without need for temperatures and heating times producing the cohesion and flow required when finely-divided plastics are fused in situ. Use of an insert assures even distribution of the plastic wherever it is desired in the final locking element as well as uniform adhesion of the thermoplastic to the flanks root of the thread. Complete fusion of the thermoplastic is not necessary, as is the case if powders are employed. Rather, the temperatures and heating times used according to the present invention need only be sufficient to cause fusion of the thermoplastic at the metal-plastic interface, where the bond to the fastener is formed. Local heating of the metal surface in the region in which plastic bonding is desired is sufficient, and the entire fastener need not be raised to a high temperature. In many cases, it is useful to avoid heating of a fastener in portions other than those in which bonding to a plastic insert is desired to form a locking element. However, it should be understood that the entire fastener can be heated, where appropriate, and that conditions of heating causing complete fusion of a formed thermoplastic insert are also permissible and are contemplated by this invention.

Since the size and shape of the plastic locking element formed by fusion of a pre-formed thermoplastic article in situ on a fastener is substantially identical with the size and shape of the pre-formed article, FIGS. 2, 3, and 4 can be considered to show fasteners having a plastic locking element formed thereon according to the present invention.

Example

A polycarbonate thermoplastic formed by condensation of bisphenol-A with thionyl chloride and commercially available under the trade name "Lexan" was molded in a multi-cavity miniature injection molding machine to form a plurality of concave-convex inserts having concave threaded surfaces substantially matching the threads of interiorly threaded metal nuts in pitch and depth. The length of the insert was less than that of the threaded portion of the nut, to facilitate engagement of the nut with a bolt, and was of a width such that the arc of the insert subtends an angle of about 90°. Narrower or wider inserts can be employed depending on the area of thread-lock surface desired, i.e. on the amount of removal torque desired.

The formed inserts were placed in a plurality of metal nuts to match the threads of the convex surface of the insert with those of the nut. The nuts were then heated at a temperature of about 550° F., above the softening point of the "Lexan" polycarbonate plastic, and were held at the elevated temperature for a time sufficient to fuse the plastic at the metal-plastic interface. On cooling, the plastic insert was found tightly bonded to the metal surface of the nut and acted as a plastic thread lock for the nut. Because of the low mold-shrinkage and good hot-melt adhesive properties of polycarbonate polymers, they are a preferred material for use according to the present invention. However, other of the materials mentioned earlier herein can be employed to give similar results.

We claim:

1. A method for making a plastic locking element bonded to a threaded fastener, which method comprises pre-forming a thermoplastic to the shape and dimensions of the desired locking element and to have threads, matching the threads of said fastener, on that surface of the thermoplastic to be bonded to said threaded fastener, mechanically applying the shaped thermoplastic to said fastener so that the threads of said thermoplastic and fastener engage, and then heating said thermoplastic to a temperature above its softening point to bond said thermoplastic to said fastener to form said locking element.

2. The method as in claim 1 wherein said thermoplastic is a thermoplastic exhibiting low mold shrinkage.

3. The method as in claim 1 wherein said thermoplastic is a polycarbonate plastic.

4. The method as in claim 1 wherein said fastener is a male fastener having an exteriorly threaded surface and wherein said thermoplastic is pre-formed to have threads matching said exterior threaded surface and is bonded to said surface.

5. The method as in claim 1 wherein said fastener is a female fastener having an interiorly threaded surface and wherein said thermoplastic is pre-formed to have threads matching said interior threaded surface and is bonded to said surface.

References Cited

UNITED STATES PATENTS

| 2,533,894 | 12/1950 | Podell | 151—7 |
| 3,093,177 | 6/1963 | Villo | 151—7 |
| 3,316,338 | 4/1967 | Rieke | 151—7 |
| 2,409,759 | 10/1946 | Hosking | 156—228 |

EDWARD C. ALLEN, Primary Examiner.

U.S. Cl. X.R.

151—7